United States Patent
Schoeffel et al.

(10) Patent No.: US 6,886,400 B2
(45) Date of Patent: May 3, 2005

(54) DEVICE AND METHOD FOR MEASURING THE INJECTION QUANTITY OF INJECTION NOZZLES, ESPECIALLY FOR MOTOR VEHICLES

(75) Inventors: Eberhard Schoeffel, Bamberg (DE); Hans Braun, Suttgart (DE); Fabian Lafrenz, Bietigheim-Bissingen (DE); Josef Seidel, Breitenguessbach (DE)

(73) Assignee: Robert Bosch GmbH, Stuttgart (DE)

( * ) Notice: Subject to any disclaimer, the term of this patent is extended or adjusted under 35 U.S.C. 154(b) by 48 days.

(21) Appl. No.: 10/203,090

(22) PCT Filed: Dec. 6, 2001

(86) PCT No.: PCT/DE01/04552

§ 371 (c)(1),
(2), (4) Date: Oct. 25, 2002

(87) PCT Pub. No.: WO02/46606

PCT Pub. Date: Jun. 13, 2002

(65) Prior Publication Data

US 2003/0110846 A1 Jun. 19, 2003

(30) Foreign Application Priority Data

Dec. 6, 2000 (DE) ......................................... 100 60 477

(51) Int. Cl.[7] ............................................. G01M 15/00
(52) U.S. Cl. .................................................... 73/119 A
(58) Field of Search ............................. 73/118.1, 119 A, 73/90; 123/480, 494, 506, 539, 485, 381; 701/99, 104

(56) References Cited

U.S. PATENT DOCUMENTS

| | | | | |
|---|---|---|---|---|
| 4,391,133 A | * | 7/1983 | Ito | ............................ 73/119 A |
| 4,488,429 A | * | 12/1984 | Ito | ............................ 73/119 A |
| 4,798,084 A | * | 1/1989 | Takahashi et al. | ........ 73/119 A |
| 6,102,000 A | * | 8/2000 | Shindoh et al. | ............. 123/381 |

FOREIGN PATENT DOCUMENTS

| | | |
|---|---|---|
| DE | 32 40 622 A | 5/1983 |
| DE | 0 378 304 A | 7/1990 |

* cited by examiner

*Primary Examiner*—Edward Lefkowitz
*Assistant Examiner*—Octavia Davis
(74) *Attorney, Agent, or Firm*—Ronald E. Greigg

(57) ABSTRACT

A device is used for measuring the injection quantity of injection nozzles. It includes a measuring chamber to which the injection nozzle can be coupled. In addition, a detection device is provided, which detects a state change of the testing fluid in the measuring chamber due to an injection by the injection nozzle. In order to be able to measure the injection quantity without wear and in a highly precise manner, the invention provides that the detection device has a capacitor, whose one electrode is comprised of an electrically conductive fluid, which is at least partially contained in a volume connected to the measuring chamber. The processing unit is connected to the capacitor in such a way that it can detect a change in its capacitance, which is produced by a movement of the electrically conductive fluid.

20 Claims, 3 Drawing Sheets

DEVICE AND METHOD FOR MEASURING THE INJECTION QUANTITY OF INJECTION NOZZLES, ESPECIALLY FOR MOTOR VEHICLES

CROSS-REFERENCE TO RELATED APPLICATIONS

This application is a 35 U.S.C. 371 application of PCT/DE 01/04552, filed on Dec. 6, 2001.

BACKGROUND OF THE INVENTION

1. Field of the Invention

The current invention relates firstly to a device for measuring the injection quantity of injection nozzles for internal combustion engines of motor vehicles and in particular in production testing, which has at least one measuring chamber that is at least partially filled with a testing fluid, a coupling device that can couple at least one injection nozzle to the measuring chamber, a detection device, which detects a state change of the testing fluid in the measuring chamber at least intermittently during an injection by the injection nozzle, and a processing unit, which, based on the signal from the detection device, determines an injection quantity that corresponds to the state change.

2. Description of the Prior Art

A device of this kind is known on the market and is referred to as an injected fuel quantity indicator. This component is comprised of a cylinder in which a piston is guided. The inner chamber of the cylinder and the piston define a measuring chamber. This measuring chamber has an opening against which an injection nozzle can be placed in a pressure-tight manner. When the injection nozzle injects fuel into the measuring chamber, the piston moves, which is detected by a travel sensor. The volume change of the measuring chamber and therefore the injected fuel quantity can be calculated from the distance traveled by the piston.

The known injected fuel quantity indicator, however, has various disadvantages. On the one hand, it has moving parts, which are subject to wear with a continuous use of such a device. This wear is relatively significant because modern injection nozzles are tested not only in random spot checks but also continuously during production. In the course of the service life of such an injected fuel quantity indicator, this wear distorts the measuring results and ends up shortening the service life of the injected fuel quantity indicator.

Moreover, friction is produced between the piston and the cylinder, which hinders the free movement of the piston and results in the fact that the movement of the piston does not fully correspond to the fuel volume actually injected. The measuring precision of the injected fuel quantity indicator is therefore limited. Finally, particularly with injection nozzles for modern diesel engines, it is also necessary to be able to reliably measure very small injection quantities. Measurements of this kind are either difficult or completely impossible with the known injected fuel quantity indicator.

The object of the current invention, therefore, is to modify a device of the type mentioned above so that it can measure the injection quantity of injection nozzles with high precision over its entire service life and can also reliably measure very small injection quantities.

This object is attained by virtue of the fact that the detection device has a capacitor, whose one electrode is comprised of an electrically conductive fluid, which is at least partially contained in a volume connected to the measuring chamber, and the processing unit is connected to the capacitor in such a way that it can detect a change in its capacitance, which is produced by a movement of the electrically conductive fluid.

SUMMARY OF THE INVENTION

There is no mechanical piston in the device according to the invention. Instead, the volume change of the measuring chamber occurring during an injection moves in a volume of an electrically conductive fluid. Naturally, even a movement of this kind is encumbered by friction, but this is several orders of magnitude smaller than that of a mechanical piston. The detection and quantification of the movement of the fluid volume also takes place without friction or wear since the fluid volume constitutes an electrode of a capacitor. The capacitance change produced by a movement of the electrode can be detected with extremely high precision without any drift over the service life of the device.

One modification is characterized in that at least one elongated electrical conductor is disposed in the volume so that it extends in its longitudinal direction through a moving boundary surface of the electrically conductive fluid; the electrical conductor is insulated in relation to the outside by means of a dielectric and thus constitutes a stationary electrode of the capacitor.

This device according to the invention therefore uses a tubular capacitor to detect a volume change of the testing fluid. This tubular capacitor is comprised of an elongated electrical conductor, which constitutes a radially inner first electrode of the capacitor. An insulation is provided around the outside of this inner electrode. The second electrode of the tubular capacitor is constituted by the electrically conductive fluid. The capacitance of the tubular capacitor depends on the size of the electrodes. If a longer region of the electrical conductor is encompassed by the electrically conductive fluid, then the capacitance of the capacitor is greater than when only a comparatively small length of the electrical conductor is encompassed by the electrically conductive fluid.

The volume in which the electrically conductive fluid is contained, however, is connected to the measuring chamber and the testing fluid contained therein. If the volume of the testing fluid changes, this correspondingly displaces the electrically conductive fluid, which moves the boundary surface of the electrically conductive fluid that the electrical conductor passes through. Consequently this also changes the length of the electrical conductor that is encompassed by the electrically conductive fluid, which in turn produces a change in the capacitance of the tubular capacitor. This change in the capacitance is detected by the processing unit. The change in the capacitance of the tubular capacitor thus produced can be expressed by the following formula:

$$dC<pF> = 0.0556 \times dL<mm> \times \epsilon / ln(D/d),$$

where:
  $dC$=change in capacitance
  $dL$=boundary surface movement
  $\epsilon$=permittivity
  $D$=outer diameter of the dielectric
  $d$=outer diameter of the electrical conductor.

This permits the total elimination of moving parts from the device according to the invention. Therefore no wear or mechanical friction of any kind occur in such a measuring device. Therefore even extremely small injection quantities can be detected by the device according to the invention.

The invention also provides that between the injection nozzle and the moving boundary surface, a flow tranquilizer is provided, which in particular, has a porous body, preferably a sintered body. This prevents an injection impulse, which is directed from the injection nozzle into the measuring chamber, from producing turbulence in the conductive fluid or a deformation of the boundary surface, which can distort the measuring result. Therefore the presence of such a flow tranquilizer results in an even more precise overall measurement result.

Another modification provides that the volume constituted by the electrically conductive fluid is at least partially bounded by a prestressed wall, in particular by a pneumatic spring. A prestressed wall or pneumatic spring of this kind pressurizes the electrically conductive fluid, as a result of which the testing fluid, which is contained in the measuring chamber and is connected to the electrically conductive fluid, is subjected to a corresponding pressure. However, when the injection nozzle executes an injection and the attendant volume increase of the testing fluid occurs, the prestressing of the wall or the pneumatic spring provide a space into which the electrically conductive fluid displaced by the testing fluid can escape.

It is particularly preferable if the pneumatic spring has a diaphragm, which is acted on by a gas on one side. Such an embodiment of the pneumatic spring makes it possible to maintain a relatively constant pressure in the electrically conductive fluid and in the testing fluid. Moreover, a pneumatic spring of this kind requires no maintenance whatsoever and the pressure in the electrically conductive fluid can be arbitrarily adjusted by means of a corresponding adjustment of the gas pressure behind the diaphragm.

The invention also enables the signal intensity to be increased in a simple manner when there is a change in the capacitance: the invention therefore provides that the device has a number of stationary electrodes that are disposed essentially parallel to one another and connected in parallel. This produces a number of parallel-connected capacitors, which share a common electrode (namely the electrically conductive fluid) and which consequently all experience a capacitance change during an injection. This increases the measuring precision considerably, particularly with small injection quantities.

The stationary electrodes can be arranged in a particularly favorable manner if the volume with the electrically conductive fluid is essentially circular in cross section. The stationary electrodes, e.g. the electrical conductors, should then be arranged as parallel as possible to the longitudinal direction of the volume.

The invention also provides that at least part of the stationary electrodes, in terms of the radial direction, are disposed in the centroids of surface areas that are essentially the same size. In this case, the "fluid" electrodes of the individual capacitors are the same size and corresponding capacitors have essentially the same capacitance or sensitivity. This facilitates the measurement. If the stationary electrodes are distributed uniformly over the cross section, this also has the advantage that the form of the boundary surface, which is not necessarily absolutely flat, e.g. due to turbulence, is averaged over the individual capacitors or electrical conductors. This eliminates distortions due to the irregularity of the boundary surface, which are geometrically greater than the average distance of the individual electrical conductors from one another.

Preferably, the stationary electrodes have a dielectric coating on the outside, which preferably contains Teflon ®. With a coating of this kind, the thickness of the dielectric can be kept to a minimum and, due to its water-repelling properties, Teflon ® prevents the buildup of conductive aqueous surface deposits, which could distort the measurements.

A modification of the device according to the invention provides that the testing fluid is oil and the electrically conductive fluid is water, in particular saline water. The use of oil as the testing fluid provides a particular good simulation of the viscosity and flow properties of diesel fuel, whereas water, in particular saline water, has the conductivity required to produce a capacitor.

In another modification, the invention provides that the boundary surface of the electrically conductive fluid directly adjoins the testing fluid. A device embodied in this manner is primarily suitable when the testing fluid and electrically conductive fluid are comprised of materials that do not mix. This includes, for example, the above-mentioned material combination of oil and water.

Finally, in another modification, the invention provides that the device includes a housing, which at least partially contains the volume with the electrically conductive fluid, and that the housing contains an electrically conductive material, which is electrically connected to the processing unit, and the stationary electrode is insulated in relation to the housing. In this embodiment of the device according to the invention, a simple connection is produced between the processing unit and the electrode comprised by electrically conductive fluid.

The invention also relates to a method for measuring the injection quantity of injection nozzles, particularly for motor vehicles and particularly in production testing, in which an injection nozzle is coupled in a pressure-tight manner to a measuring chamber that is at least partially filled with a testing fluid, the state change of the testing fluid due to an injection of the injection nozzle into the measuring chamber is detected, and an injection quantity is determined based on the state change.

In order to increase the measuring precision, the invention provides that a state change of the testing fluid results in a movement of an electrically conductive fluid, which in turn constitutes an electrode of a capacitor, and the change in the capacitance of the capacitor is detected, which is produced by a movement of the boundary surface of the electrically conductive fluid. A method of this kind functions without any moving parts so that distortions of the measurement due to friction and the wear associated with it can be significantly reduced or even eliminated. The method according to the invention therefore functions with very high precision.

BRIEF DESCRIPTION OF THE DRAWINGS

An exemplary embodiment of the invention will be explained in detail below in conjunction with the accompanying drawings in which.

DESCRIPTION OF THE PREFERRED EMBODIMENTS

Figure 1:
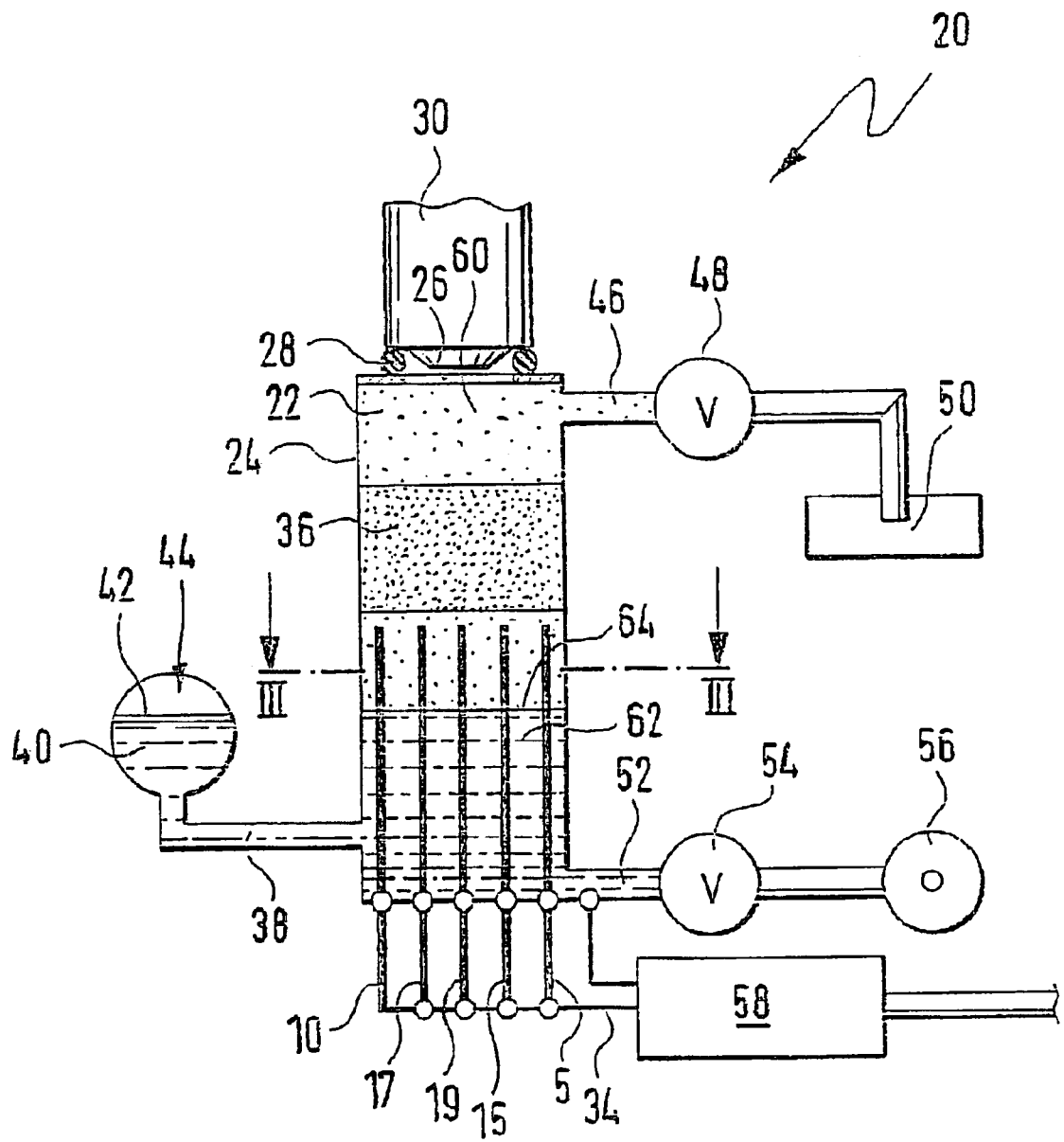
FIG. 1 shows a schematic, partially sectional side view of a device for measuring the injection quantity of injection nozzles.

In FIG. 1, a device for measuring the injection quantity of injection nozzles, labeled with the reference numeral 20, includes a cylindrical measuring chamber 22, which is produced in the upper region of a cylindrical housing 24. At the upper end of the housing 24 in FIG. 1, there is an opening 26, which is externally encompassed by an O-ring seal 28. The tip of an injection nozzle 30 is placed against the O-ring.

This injection nozzle 30 is one of the kind used in internal combustion engines for motor vehicles and in this instance, particularly for internal combustion engines that operate with direct injection of diesel or gasoline. As a rule, the opening 26 is closed by a valve (not shown), which only opens when an injection nozzle 30 is placed onto the O-ring seal 28 or is inserted into the opening 26.

Figure 2:
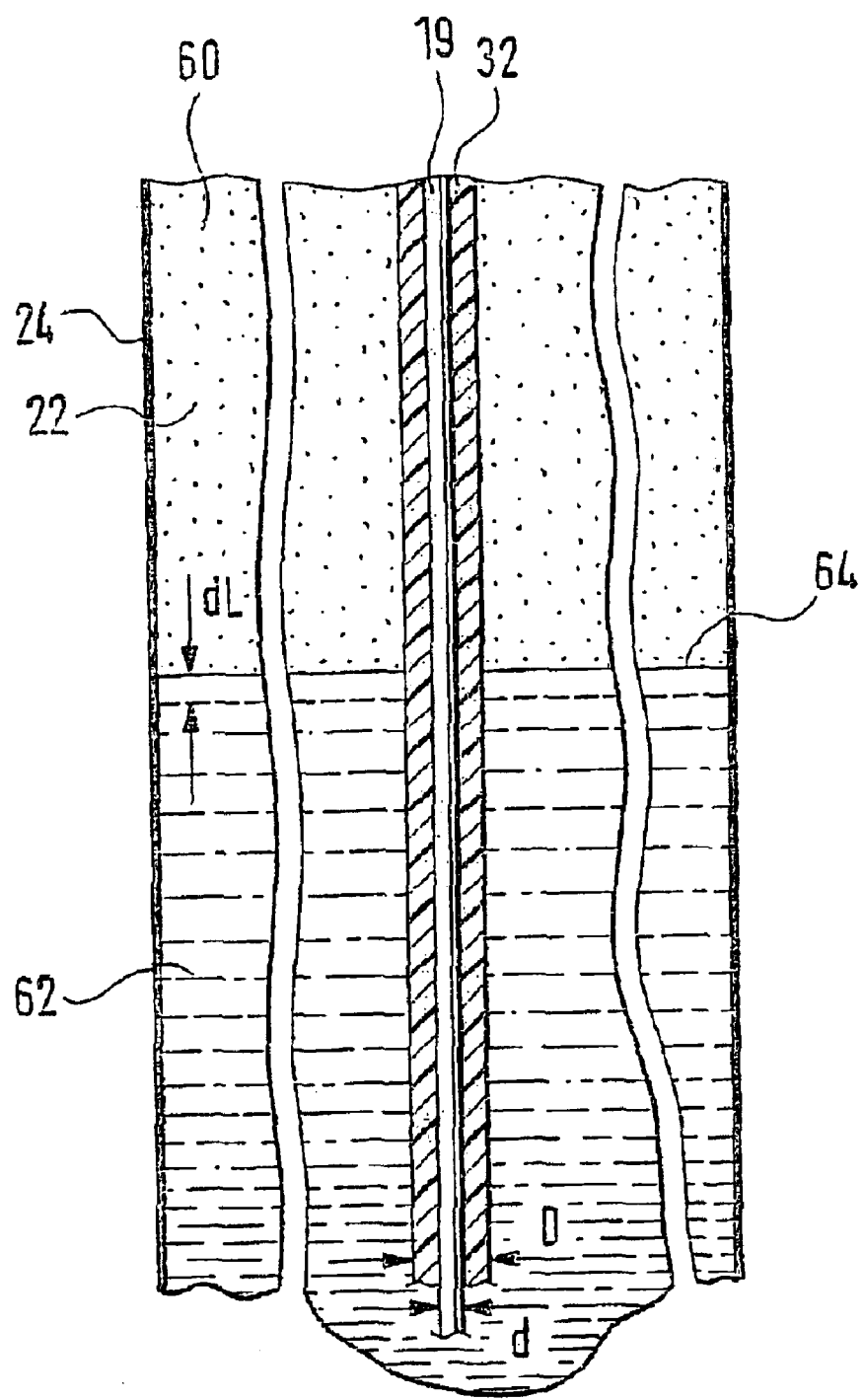
FIG. 2 shows a view of a detail of the device from FIG. 1.
Figure 3:
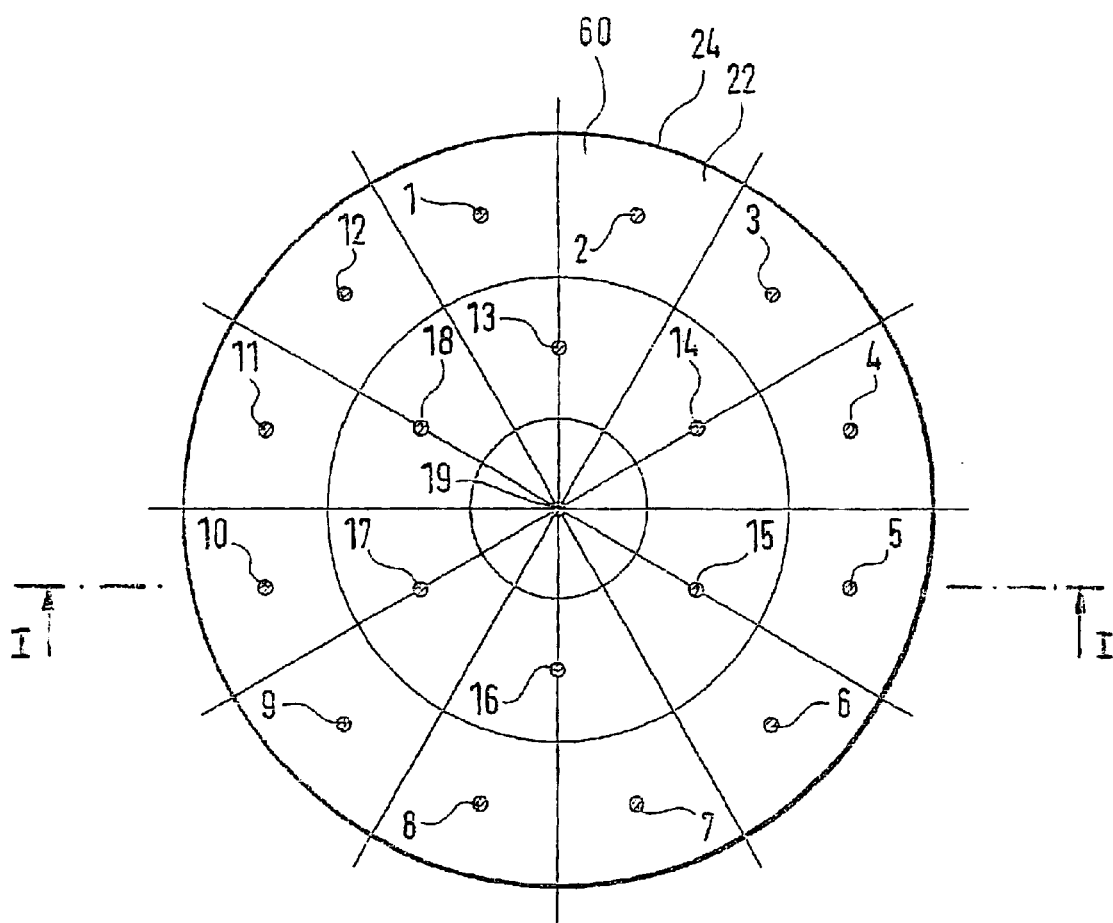
FIG. 3 shows a section through the device from FIG. 1, along the line III—III.

The housing 24 is comprised of metal. A total of 19 elongated electrical conductors pass through its bottom end and extend upward, parallel to the longitudinal axis of the housing 24, until slightly beyond half the height of the housing 24. For the sake of clarity, only five conductors are shown in FIG. 1, which are labeled with the reference numerals 5, 10, 15, 17, and 19. FIG. 3 shows all 19 of the conductors and they are labeled the reference numerals 1 to 19. As is clear from FIG. 3, the electrical conductors 1 to 19 are disposed in the centroids of surface areas that are the same size. The reason for this will be explained later. As is clear from FIG. 2, the electrical conductors 1 to 19 are each covered with a dielectrical coating 32 on the outside. The electrical conductors 1 to 19 are also electrically insulated in relation to the housing 24 and are connected to a distributing line 34 outside the housing 24. A disk-shaped sintered body 36 is disposed in the measuring chamber 22, between the upper ends of the electrical conductors 1 to 19 in FIG. 1 and the opening 26 in the housing 24.

A line 38 branches from the lower region of the housing 24 and leads to an equalizing vessel 40. On the whole, this equalizing vessel is ball-shaped and as a rule, a horizontal diaphragm 42 is stretched across its upper region. The space between the diaphragm 42 and the upper region of the equalizing vessel 40 is filled with a gas, thus producing a pneumatic spring 44. The measuring chamber 22 in the upper region of the housing 24 is also connected to an overflow 50 by means of a line 46 and a valve 48. A line 52 also branches from the lower region of the housing 24 and can be connected to a supply device 56 by means of a valve 54. Finally, an electronic processing unit 58 is provided, which is electrically connected to the distributing line 34 on the one hand and is connected to the metallic housing 24 on the other.

As is particularly clear from FIG. 1, the measuring chamber 22 is filled with a testing oil 60, which has a finite and known compressibility. The lower region of the housing 24 is filled with an electrically conductive fluid, in the current instance, a saline water solution 62. Since the testing oil 60 is specifically lighter than the saline water solution 62, the stratification shown in FIG. 1 occurs automatically. The saline water solution 62 directly adjoins a boundary surface 64 of the testing oil. The quantities of the testing oil 60 disposed in the housing 24 and of the saline water solution 62 are matched to each other so that the boundary surface 64 lies somewhat below the upper ends of the electrical conductors 1 to 19.

The electrical conductors 1 to 19 and the saline water solution 62 encompassing them constitute a total of 19 tubular capacitors, whose one electrode is constituted by the electrical conductors 1 to 19 and whose other electrode is constituted by the saline water solution 62. The two electrodes are separated from each other by the thickness of the dielectric coating 32. The capacitance of an individual capacitor thus produced is calculated according to the following relationship:

$$C=0.0556 \times L \times \epsilon : ln(D/d),$$

where:

C=capacitance,

L=longitudinal span of an electrical conductor 1 to 19, which is encompassed by saline water solution 62, $\epsilon$=permittivity, D=outer diameter of the dielectric coating 32, d=outer diameter of an electrical conductor 1 to 19.

The fact that the capacitors, which are comprised of the electrical conductors 1 to 19 and the saline water solution 62, are parallel connected by means of the distributing line 34 produces an overall capacitance that corresponds to 19 times the individual capacitance of one capacitor. The above relationship shows that the capacitance C is a function of the longitudinal span of the electrical conductor 1 to 19, which is encompassed by saline water solution 62. It should be noted at this point that in the region of the electrical conductors 1 to 19, which is encompassed by testing oil 60, the outer electrode is constituted by the metal housing 24. Comparatively speaking, this housing is spaced very far apart from the electrical conductors 1 to 19 so that its capacitance is negligibly low in comparison to the capacitance mentioned above.

If the longitudinal span of an electrical conductor 1 to 19, which is encompassed by saline water solution 62, changes due to the fact that the boundary surface 64 moves by an amount dL (see FIG. 2), then this also changes the capacitance of the corresponding capacitor. In the current device 20 for measuring the quantity of testing oil 60 injected into the measuring chamber 22 by the injection nozzle 30, this interrelationship is used in the following manner:

When the injection nozzle 30 injects testing oil into the housing 24 through the opening 26, the volume of the testing oil 60 in the measuring chamber 22 increases due to the known and finite compressibility of the testing oil 60. As a result, the saline water solution 62 is displaced from the housing 24 by the amount of the injected volume, which in turn means that the boundary surface 64 moves downward by an amount dL. The saline water solution 62 thus flows through the line 38 into the equalizing vessel 40 and presses the diaphragm 42 slightly upward, counter to the gas pressure of the pneumatic spring 44. Therefore the pneumatic spring 44 keeps the saline water solution 62 and the testing oil 60 at an essentially constant pressure.

The movement of the boundary surface 64 by the amount dL changes the capacitance of each respective capacitor, which are each constituted by an electrical conductor 1 to 19 and the saline water solution 62, by the value dC. This value is calculated according to the following formula:

$$dC=0.0556 \times dL \times \epsilon / ln(D/d).$$

Since the individual capacitors are distributed uniformly over the cross sectional area of the housing 24, irregularities in the boundary surface 64 caused by turbulences are averaged out and compensated. However, turbulences in the vicinity of the boundary surface 64 are already largely prevented by the sintered body 36. The total capacitance change of all 19 capacitors therefore corresponds to 19 times the capacitance change of a single capacitor. Such a change in the capacitance of the capacitors is detected by the processing unit 58 and converted into an injection volume according to a previously stored calibration table.

The device 20 described above can consequently detect the quantity of a testing oil 60 injected into the measuring chamber 22 by the injection nozzle 30, without the need for moving mechanical parts in the device 20. Moreover, the possibility of placing a large number of individual capacitors in the housing 24, permits an "amplification" of the signal so that even extremely small injection quantities can be reliably detected. The precision of the measurement is also increased by the sintered body 36, which serves to keep turbulences produced in the measuring chamber 22 by the spray of the injection nozzle 30 away from the capacitors constituted by the electrical conductors 1 to 19 and the saline water solution 62. Because the individual capacitors are disposed in the centroids of surface areas that are the same size, their capacitances can be simply added up without requiring a weighting of the individual capacitors in relation to other capacitors.

The foregoing relates to preferred embodiments of the invention, it being understood that other variants and embodiments thereof are possible within the spirit and scope of the invention, the latter being defined by the appended claims.

We claim:

1. A device for measuring the injection quantity of injection nozzles (30), in particular for motor vehicles and in particular in production testing, the device comprising
    at least one measuring chamber (22) that is at least partially filled with a testing fluid (60),
    a coupling device (28) that can couple at least one injection nozzle (30) to the measuring chamber (22) in a pressure-tight manner,
    a detection device which detects a state change of the testing fluid (60) in the measuring chamber (22) at least intermittently during an injection by the injection nozzle (30), and
    a processing unit (58), which, based on the signal from the detection device, determines an injection quantity that corresponds to the state change,
    the detection device including a capacitor whose one electrode is comprised of an electrically conductive fluid (62), which is at least partially contained in a volume connected to the measuring chamber (22), and
    the processing unit (58) being connected to the capacitor in such a way that it can detect a change in its capacitance, which is produced by a movement of the electrically conductive fluid (62).

2. The device according to claim 1 further comprising at least one elongated electrical conductor (1 to 19) disposed in the volume so that it extends in its longitudinal direction through a moving boundary surface (64) of the electrically conductive fluid (62); the electrical conductor (1 to 19) being insulated in relation to the outside by means of a dielectric (32) and thus constituting a stationary electrode of the capacitor.

3. The device according to claim 1 further comprising a flow tranquilizer between the injection nozzle and the moving boundary surface (64), the flow tranquilizer having a porous body, preferably a sintered body.

4. The device according to claim 2 further comprising a flow tranquilizer between the injection nozzle and the moving boundary surface (64), the flow tranquilizer having a porous body, preferably a sintered body.

5. The device according to claim 1 wherein the volume constituted by the electrically conductive fluid (62) is at least partially bounded by a prestressed wall (42), in particular by a pneumatic spring (44).

6. The device according to claim 2 wherein the volume constituted by the electrically conductive fluid (62) is at least partially bounded by a prestressed wall (42), in particular by a pneumatic spring (44).

7. The device according to claim 3 wherein the volume constituted by the electrically conductive fluid (62) is at least partially bounded by a prestressed wall (42), in particular by a pneumatic spring (44).

8. The device according to claim 5 wherein the pneumatic spring (44) has a diaphragm (42), which is acted on by a gas on one side.

9. The device according to claim 1 having a number of stationary electrodes (1 to 19) that are disposed essentially parallel to one another and connected in parallel.

10. The device according to claim 2 having a number of stationary electrodes (1 to 19) that are disposed essentially parallel to one another and connected in parallel.

11. The device according to claim 1 wherein the volume is essentially circular in cross section.

12. The device according to claim 11 wherein at least part of the stationary electrodes (1 to 19), in terms of the radial direction, are disposed in the centroids of surface areas that are essentially the same size.

13. The device according to claim 1 wherein the stationary electrodes (1 to 19) have a dielectric coating (32) on the outside, which preferably contains Teflon ®.

14. The device according to claim 12 wherein the stationary electrodes (1 to 19) have a dielectric coating (32) on the outside, which preferably contains Teflon ®.

15. The device according to claim 1 wherein the testing fluid is oil (60) and the electrically conductive fluid is water, in particular saline water (62).

16. The device according to claim 1 wherein the boundary surface (64) of the electrically conductive fluid (62) directly adjoins the testing fluid (60).

17. The device according to claim 5 wherein the boundary surface (64) of the electrically conductive fluid (62) directly adjoins the testing fluid (60).

18. The device according to claim 1 further comprising a housing (24), which at least partially contains the volume with the electrically conductive fluid (62), and wherein the housing (24) contains an electrically conductive material, which is electrically connected to the processing unit (58), and the stationary electrode (1 to 19) is insulated in relation to the housing.

19. The device according to claim 2 further comprising a housing (24), which at least partially contains the volume with the electrically conductive fluid (62), and wherein the housing (24) contains an electrically conductive material, which is electrically connected to the processing unit (58), and the stationary electrode (1 to 19) is insulated in relation to the housing.

20. A method for measuring the injection quantity of injection nozzles (30), particularly for motor vehicles and particularly in production testing, comprising,
    coupling at least one injection nozzle (30) in a pressure-tight manner to a measuring chamber (22) that is at least partially filled with a testing fluid (60),
    detecting the state change of the testing fluid (60) due to an injection of the injection nozzle (30) into the measuring chamber (22)
    determining the injection quantity based on the state change,
    the state change of the testing fluid (60) resulting in a movement of an electrically conductive fluid (62), which in turn constitutes an electrode of a capacitor, and
    detecting the change in the capacitance of the capacitor is detected, which is produced by a movement of the boundary surface (64) of the electrically conductive fluid (62).

* * * * *